US011373526B2

(12) United States Patent
Liu et al.

(10) Patent No.: US 11,373,526 B2
(45) Date of Patent: Jun. 28, 2022

(54) METHOD FOR WARNING OF TRAFFIC LIGHT BASED ON MACHINE VISION TECHNOLOGY AND DETECTING DEVICE THEREOF

(71) Applicant: Shenzhen XiaoR Geek Technology Co., Ltd., Guangdong (CN)

(72) Inventors: Hui Liu, Guangdong (CN); Leitao Yang, Guangdong (CN)

(73) Assignee: Shenzhen XiaoR Geek Technology Co., Ltd., Shenzhen (CN)

(*) Notice: Subject to any disclaimer, the term of this patent is extended or adjusted under 35 U.S.C. 154(b) by 99 days.

(21) Appl. No.: 16/952,047

(22) Filed: Nov. 18, 2020

(65) Prior Publication Data

US 2022/0084403 A1   Mar. 17, 2022

(30) Foreign Application Priority Data

Sep. 15, 2020 (CN) .......................... 202010967329.0

(51) Int. Cl.
*G06V 20/58* (2022.01)
*G08G 1/0962* (2006.01)
*G08G 1/01* (2006.01)
*H04N 5/225* (2006.01)

(52) U.S. Cl.
CPC .......... *G08G 1/0962* (2013.01); *G06V 20/58* (2022.01); *G06V 20/584* (2022.01); *G08G 1/0112* (2013.01); *H04N 5/2253* (2013.01)

(58) Field of Classification Search
CPC .... G06V 20/58; G06V 20/584; G08G 1/0962; G08G 1/0112; H04N 5/2253
See application file for complete search history.

(56) References Cited

U.S. PATENT DOCUMENTS

| 6,384,741 | B1 * | 5/2002 | O'Leary, Sr. ........... | H04N 7/183 348/E7.087 |
| 9,881,220 | B2 * | 1/2018 | Koravadi ............. | G06V 20/584 |
| 2017/0355375 | A1 * | 12/2017 | Ferguson ............... | G06V 20/56 |
| 2020/0287745 | A1 * | 9/2020 | Lavy ...................... | B64C 39/02 |
| 2020/0324700 | A1 * | 10/2020 | Asfaw ................... | G01S 13/867 |
| 2022/0076037 | A1 * | 3/2022 | Hochman ............ | G08G 1/0112 |

* cited by examiner

*Primary Examiner* — Benyam Haile (57) ABSTRACT

Disclosed is a method for warning of a traffic light based on machine vision technology and a detecting device thereof, the method includes the following steps: mounting a detecting device for detecting a traffic light on a top part of a vehicle, and mounting a notification assembly of the detecting device inside the vehicle; receiving a detection request of traffic light status, increasing a height of a camera of the detecting device, and obtaining current image information of the traffic light; determining the traffic light status in the current image information of the traffic light using the machine vision technology, sending a determined result to the notification assembly, and providing a driver with current traffic light information using the notification assembly.

18 Claims, 5 Drawing Sheets

METHOD FOR WARNING OF TRAFFIC LIGHT BASED ON MACHINE VISION TECHNOLOGY AND DETECTING DEVICE THEREOF

CROSS REFERENCE TO RELATED APPLICATIONS

The present application claims priority from Chinese patent application No. 202010967329.0 filed on Sep. 15, 2020. The entire disclosure of the application is hereby incorporated by reference in its entirety.

FIELD OF THE INVENTION

The present application relates to the technical field of traffic management, and in particular, to a method for warning of a traffic light based on machine vision technology and a detecting device thereof.

BACKGROUND OF THE INVENTION

With the development of the economy, small cars become popular amongst most households, while larger vehicles such as trucks and buses have also increased. Traffic lights are set up at many intersections. During waiting for the traffic light, there are often large vehicles in front of the small car that block the car driver's view of the traffic lights. When it is passable, the small car usually needs to wait until the large vehicles in front of it have advanced a certain distance before it can see the traffic light. This is very inefficient for traffic sections that need to maintain high efficiency. In addition, when the small car starts at the same time with the large vehicles, the traffic light may turn red as the small car passes the line so that the car may drive through the red light by mistake.

The information disclosed in the background section is only for enhancement of understanding of the overall background of the present application, and should not be taken as an acknowledgement or any form of suggestion that the information constitutes the prior art known to those skilled in the art.

SUMMARY OF THE INVENTION

In order to meet the above requirements, an objective of the present application is to provide a method for warning of a traffic light based on machine vision technology and a detecting device thereof.

In order to achieve the above objective, the present application adopts the following technical proposals:

a method for warning of a traffic light based on machine vision technology, including the following steps:

mounting a detecting device for detecting a traffic light on a top part of a vehicle, and mounting a notification assembly of the detecting device inside the vehicle;

increasing a height of a camera of the detecting device to obtain current image information of the traffic light when a detection request of traffic light status is received;

determining the traffic light status in the current image information of the traffic light using the machine vision technology, sending a determined result to the notification assembly, and providing a driver with current traffic light information using the notification assembly.

In a possible embodiment, the step of receiving the detection request of the traffic light status includes determining information detected by an acceleration sensor, and performing following step if the vehicle is determined to have stopped: the detection request of the traffic light status is deemed to be raised if an obstacle is detected in front of the vehicle and not above the vehicle.

A detecting device used by the method for warning of a traffic light based on machine vision technology according to any one of the above, the detecting device includes a device main body, a retractable assembly mounted on the device main body, distance sensors and an acceleration sensor mounted on the device main body, a camera for observing the traffic light, and a notification assembly for displaying the traffic light status; the device main body includes a first connecting part for fix connection with the vehicle, a second connecting part for connection with the retractable assembly, and a driving assembly for driving the retractable assembly; the device main body is equipped with a first distance sensor at an upper end thereof for detecting whether an obstacle exists above the vehicle, and a second distance sensor at a front end thereof for detecting whether a vehicle exists ahead.

In a possible embodiment, the second connecting part includes two supporting bases arranged in parallel, each supporting base is provided with a hinge hole, a bottom part of the retractable assembly is provided with a connecting shaft, and the connecting shaft is mounted in the hinge holes, so that the connecting shaft is in transmission connection with the driving assembly.

In a possible embodiment, the retractable assembly includes a plurality of sets of transmission mechanisms, each of the transmission mechanisms includes two connecting rods hinged together at a midpoint of the connecting rods; the hinge hole are provided at two ends and the midpoint of the connecting rods, and adjacent transmission mechanisms of the retractable assembly are connected by hinge shafts.

In a possible embodiment, the retractable assembly includes a plurality of connecting rods, both ends of the connecting rods are provided with the hinge hole, the connecting rods are sequentially connected by hinge shafts, and the camera is mounted on an uppermost connecting rod.

In a possible embodiment, the first connecting part is a mounting hole or an adhesive structure.

In a possible embodiment, the device main body is equipped with a control circuit board.

In a possible embodiment, the control circuit board is provided with a Bluetooth chip or a Wi-Fi chip for communication with the vehicle.

In a possible embodiment, the device main body is equipped with a battery.

Compared with the prior art, the present application is advantageous in that the method for warning of a traffic light based on machine vision technology and the detecting device thereof provided in the present application may determine the current traffic light status while waiting behind a vehicle.

If an obstacle is not detected by the second distance sensor, then there is no large vehicle ahead and view is not obstructed, thus the retractable assembly does not extend;

If an obstacle is detected by the first distance sensor, then the vehicle is in an underground garage or there is an obstacle above, thus the retractable assembly does not extend;

If the acceleration sensor detects that the vehicle is in motion, then the vehicle is not waiting for a traffic light, thus the retractable assembly does not extend or is retracted automatically.

If the acceleration sensor detects that the vehicle has stopped, and an obstacle is detected in front of the vehicle by the second distance sensor and no obstacle is detected by the first distance sensor, then the vehicle is currently waiting for the traffic light and there is a vehicle blocking the view ahead. At this time, the retractable assembly extends, and the camera at a terminal end thereof is protruded to detect the status of the traffic light ahead. The detected result may be directly displayed on a display screen in the vehicle, and may be notified to the driver by sound or light. Therefore, this improves traffic efficiency and provides drivers with traffic status information.

The present application will be further described below in conjunction with accompanying drawings and detailed embodiments.

BRIEF DESCRIPTION OF THE DRAWINGS

In order to illustrate more clearly the technical proposals of the embodiments of the present application, the accompanying drawings used in the description of the embodiments will be briefly introduced below. It is obvious that the drawings described below are some embodiments of the present application, to those skilled in the art, other drawings can be obtained based on these drawings without creative work.

| Reference signs | |
|---|---|
| 100 vehicle | 200 device main body |
| 210 retractable assembly | 202 second connecting part |
| 2021 supporting base | 2022 hinge hole |
| 2023 connecting shaft | 2024 connecting rod |
| 2025 hinge hole | 203 first distance sensor |
| 204 second distance sensor | 300 camera |

DETAILED DESCRIPTION OF THE EMBODIMENTS

The technical proposals in the embodiments of the present application will be clearly and completely described in conjunction with the accompanying drawings in the embodiments of the present application. It is apparent that the described embodiments are part of the embodiments of the present application rather than all embodiments. Based on the embodiments in the present application, all other embodiments obtained by those skilled in the art without creative work shall fall within the scope of protection of the present application.

In the description of the present application, it should be understood that the terms "center", "longitudinal direction", "transverse direction", "length", "width", "thickness", "upper", "lower", "front", ""rear", "left", "right", "vertical", "horizontal", "top", "bottom", "inner", "outer", "clockwise", "counterclockwise" etc. indicate an orientation or positional relationship that is based on the orientation or positional relationship shown in the drawings, and are only for the convenience of describing the application and simplifying the description, rather than indicating or implying that the device or element referred to must have a specific orientation and be constructed and operated in a specific orientation, therefore these cannot be understood as a limitation to the present application.

In addition, the terms "first" and "second" are used for descriptive purposes only, and cannot be understood as indicating or implying relative importance or implicitly indicating the number of technical features referred to. Therefore, the features defined as "first" and "second" may explicitly or implicitly include one or more of the features. In the description of the present application, the meaning of "plurality" is two or more, unless otherwise specified.

In the present application, unless otherwise clearly specified and limited, the terms "installation", "connected", "fixed" and other terms should be interpreted as broad meaning, for example, it may be connected or detachably connected, or formed into one entity; it may be a physical connection or electrical connection; it may be directly connected, or it may be indirectly connected through an intermediate medium; it may be an internal communication or interaction between two elements. Those skilled in the art can understand the specific meanings of the above terms in the present application according to specific situations.

In the present application, unless otherwise clearly specified and defined, a first feature "above" or "below" a second feature may include the direct contact of the first and second features, or may include the first and second features not in direct contact but through another feature therebetween. Moreover, the first feature is "on", "above" and "over" the second feature includes that the first feature is directly above and obliquely above the second feature, or simply means that the first feature is higher in level than the second feature. The first feature is "under", "below" and "underneath" the second feature includes that the first feature is directly below and obliquely below the second feature, or simply means that the first feature is lower in level than the second feature.

In the description of the present application, the description referring to the terms "one embodiment", "some embodiments", "examples", "specific examples", or "some examples" means the specific features, structures, materials or characteristics described in conjunction with the embodiment or example is included in at least one embodiment or example of the present application. In the present application, the illustrative expression of the above terms should not be understood as having to refer to the same embodiment or example. Moreover, the specific features, structures, materials, or characteristics described may be combined in any suitable manner in any one or more embodiments or examples. In addition, those skilled in the art may bind and combine different embodiments or examples described in the present application.

Figure 1:
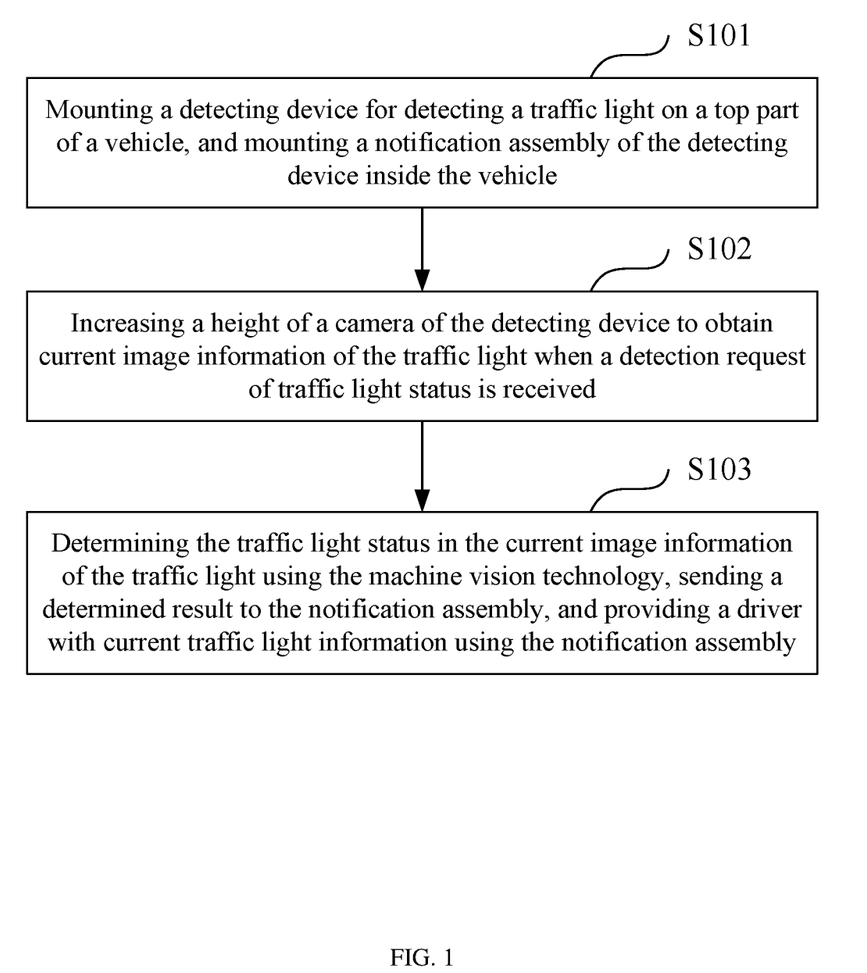
FIG. 1 is a flowchart of a detailed embodiment of the method for warning of a traffic light based on machine vision technology provided by the present application.
Figure 2:
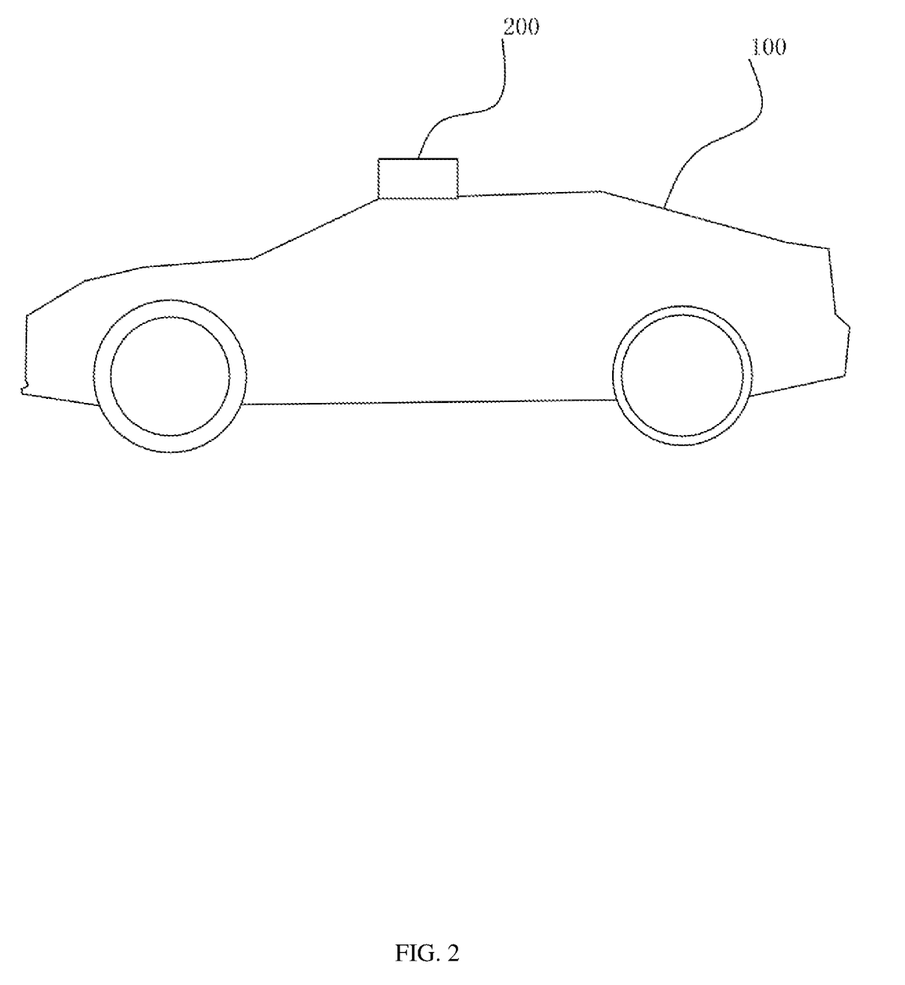
FIG. 2 is a schematic diagram of a specific implementation of the method for warning of a traffic light based on machine vision technology provided by the present application.
Figure 3:
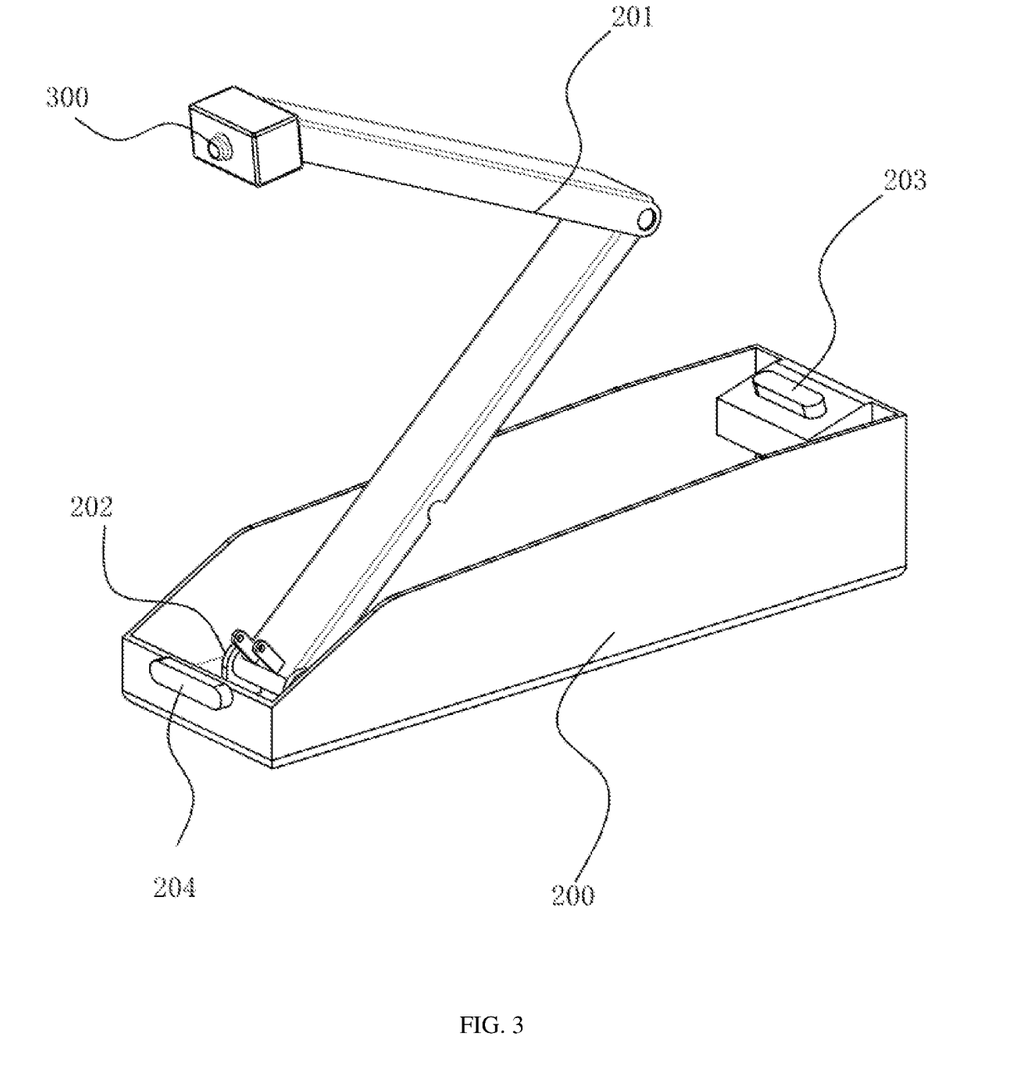
FIG. 3 is a structural view of a detailed embodiment of the detecting device used by the method for warning of a traffic light based on machine vision technology provided by the present application.
Figure 4:
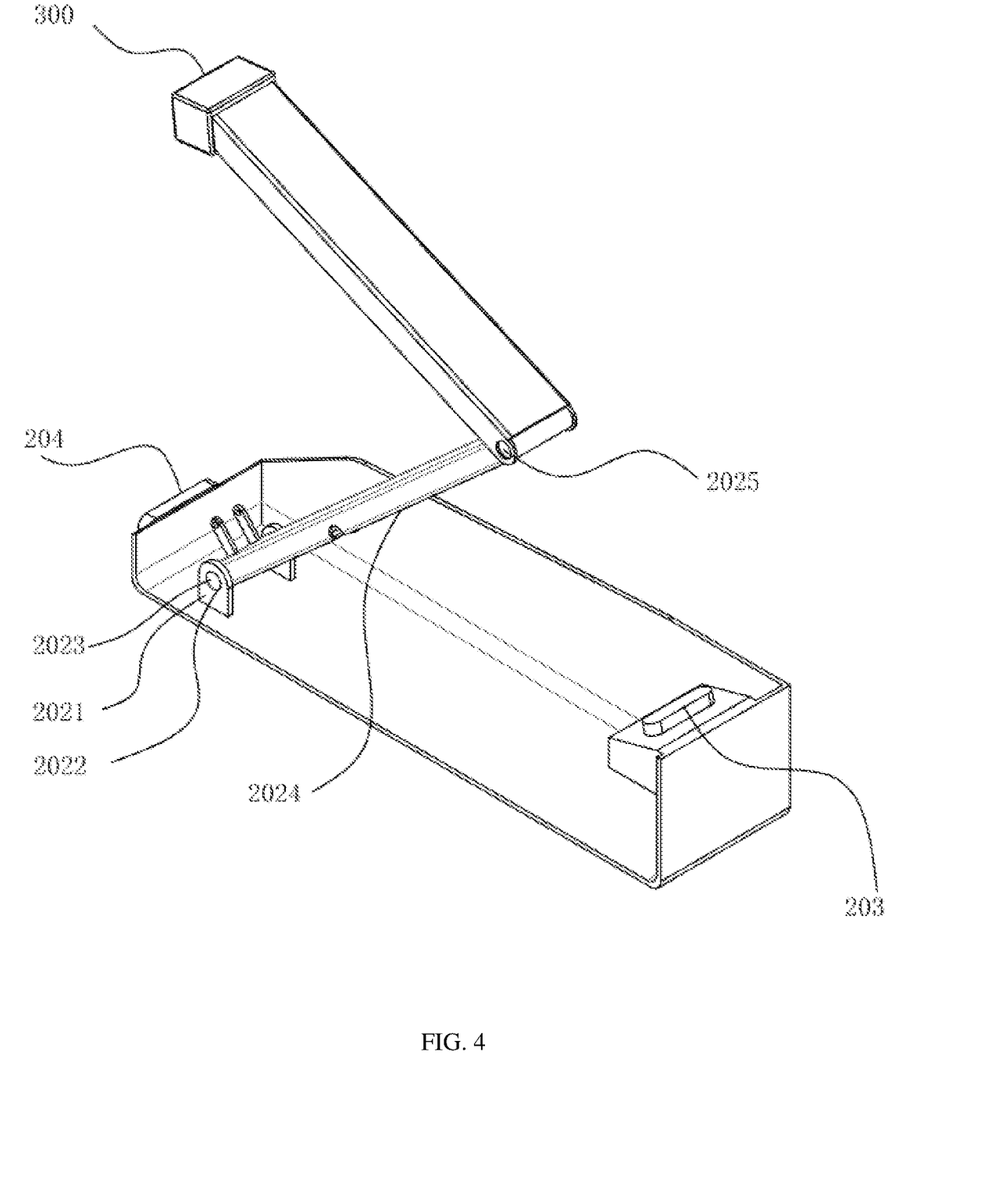
FIG. 4 is a structural view of the device main body with a partially hidden device housing in a detailed embodiment of the detecting device used by the method for warning of a traffic light based on machine vision technology provided by the present application.
Figure 5:
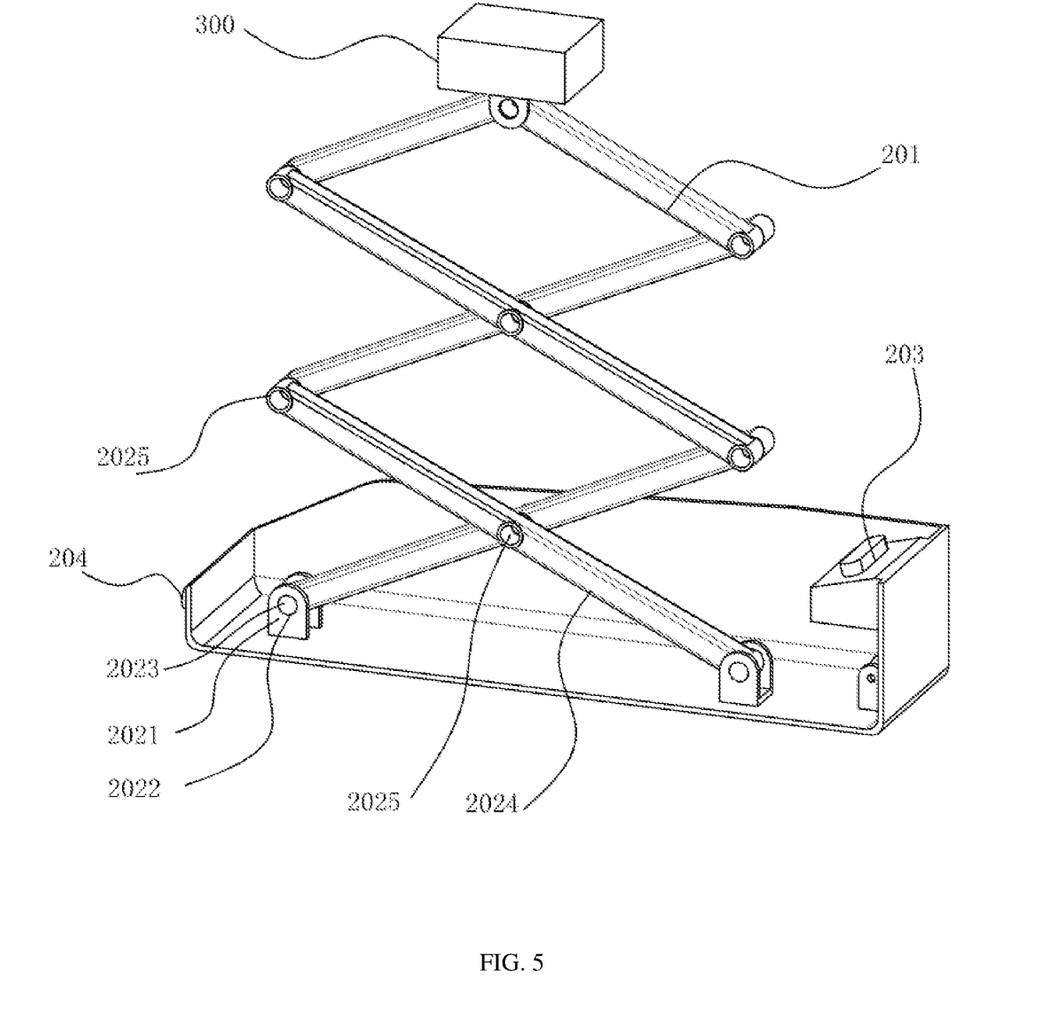
FIG. 5 is a structural view of another detailed embodiment of the detecting device used by the method for warning of a traffic light based on machine vision technology provided by the present application.

Referring to FIGS. 1-5, FIG. 1 is a flowchart of a detailed embodiment of the method for warning of a traffic light based on machine vision technology provided by the present application; FIG. 2 is a schematic diagram of a specific implementation of the method for warning of a traffic light based on machine vision technology provided by the present application; FIG. 3 is a structural view of a detailed embodiment of the detecting device used by the method for warning of a traffic light based on machine vision technology provided by the present application; FIG. 4 is a structural view of the device main body with a partially hidden device housing in a detailed embodiment of the detecting device used by the method for warning of a traffic light based on machine vision technology provided by the present application; and FIG. 5 is a structural view of another detailed embodiment of the detecting device used by the method for warning of a traffic light based on machine vision technology provided by the present application.

The present application provides a method for warning of a traffic light based on machine vision technology, including the following steps:

Step S101: mounting a detecting device for detecting a traffic light on a top part of a vehicle, and mounting a notification assembly of the detecting device inside the vehicle;

Wherein the detecting device transmits the detected traffic light information to the notification assembly so that the driver can obtain real-time traffic light information.

Step S102: increasing a height of a camera of the detecting device to obtain current image information of the traffic light when a detection request of traffic light status is received;

Specifically, the step of receiving the detection request of the traffic light status includes determining information detected by an acceleration sensor, and performing following steps if the vehicle is determined to have stopped: if an obstacle is detected by the second distance sensor but not detected by the first distance sensor, it is deemed that the detection request of the traffic light status is raised. At this time, the retractable assembly of the detecting device is controlled to extend upward to increase the height of the camera.

Step S103: determining the traffic light status in the current image information of the traffic light using the machine vision technology, sending a determined result to the notification assembly, and providing a driver with current traffic light information using the notification assembly.

As shown in FIGS. 2-5, the present application provides a detecting device used by the method for warning of a traffic light based on machine vision technology according to any one of the above, the detecting device includes a device main body 200 mounted on a vehicle 100, a retractable assembly 201 mounted on the device main body 200, distance sensors and an acceleration sensor mounted on the device main body 200, a camera 300 for observing the traffic light, and a notification assembly for displaying the traffic light status. The device main body 200 is equipped with a battery and a control circuit board for circuit control and power supply. The device main body 200 includes a first connecting part for fix connection with the vehicle 100, a second connecting part 202 for connection with the retractable assembly 201, and a driving assembly for driving the retractable assembly 201. Since the vehicle may encounter various traffic conditions and obstacles during driving and may not suitable to extend the retractable assembly 201, an upper end of the device main body 200 is equipped with a first distance sensor 203 for detecting whether there is an obstacle above the vehicle 100, and a front end of the device main body 200 is equipped with a second distance sensor 204 for detecting whether there is a vehicle ahead. In order to carry out the detection function, the first distance sensor 203 and the second distance sensor 204 is connected to the control circuit board, and the control circuit board receives the detected signal from the sensors. If an obstacle is not detected by the second distance sensor 204, then there is no large vehicle ahead and view is not obstructed, thus the retractable assembly 201 does not extend; if an obstacle is detected by the first distance sensor 203, then the vehicle is in an underground garage or there is an obstacle above, thus the retractable assembly 201 does not extend; if the acceleration sensor detects that the vehicle is in motion, then the vehicle is not waiting for a traffic light, thus the retractable assembly 201 does not extend or is retracted automatically.

If the acceleration sensor detects that the vehicle has stopped, and an obstacle is detected in front of the vehicle by the second distance sensor 204 and no obstacle is detected by the first distance sensor 203, then the vehicle is currently waiting for the traffic light and there is a vehicle blocking the view ahead. At this time, the retractable assembly 201 extends, and the camera 300 at a terminal end thereof is protruded to detect the status of the traffic light ahead.

In an embodiment as shown in FIGS. 4 and 5, the second connecting part 202 includes two supporting bases 2021 arranged in parallel, each supporting base 2021 is provided with a hinge hole 2022, a bottom part of the retractable assembly 201 is provided with a connecting shaft 2023, and the connecting shaft 2023 is mounted in the hinge holes 2022, so that the connecting shaft 2023 is in transmission connection with the driving assembly. The driving assembly may be a driving motor, which is connected to the connecting shaft 2023 by a coupling in order to drive the retractable assembly 201 to move up and down.

In an embodiment as shown in FIG. 5, the retractable assembly 201 includes a plurality of sets of transmission mechanisms, each of the transmission mechanisms includes two connecting rods 2024 hinged together at a midpoint of the connecting rods; the hinge hole 2025 are also provided at two ends and the midpoint of the connecting rods 2024, and the adjacent transmission mechanisms of the retractable assembly 201 are connected by hinge shafts (not shown). A bottommost transmission mechanism is used for connecting with the second connecting part 202 in order to support. The camera 300 is mounted on an uppermost transmission mechanism to capture images of the traffic light after the retractable assembly 201 is extended. In the present embodiment, the connecting rods 2024 form a parallelogram shape for stable transmission.

In an embodiment as shown in FIG. 4, the retractable assembly includes at least two connecting rods 2024. Both ends of the connecting rods 2024 are provided with hinge holes 2025. The connecting rods 2024 are sequentially connected by a hinge shaft. The camera 300 is mounted on uppermost connecting rods 2024. One end of bottommost connecting rods is connected to the second connecting part 202 and is rotatable around a position of the hole where it is connected to the second connecting part 202. One end of an upper connecting rod is connected with a lower connecting rod, and is also rotatable around a connecting point thereof. In the present embodiment, less connecting rods 2024 are used so that simple installation steps are achieved compared to the transmission mechanism of the previous embodiment.

The notification assembly includes a display screen or a buzzer, which may notify the driver of the traffic light status in time by mounting inside the vehicle. Furthermore, as the image information of the traffic light is obtained, the current color may be recognized by machine vision technology, and the buzzer may be used to send voice reminders. Since the device main body 200 needs to be connected to a control system of the vehicle for data sharing, the control circuit board is provided with a Bluetooth chip or a Wi-Fi chip for communicating with the vehicle, which can avoid the disadvantages of wired connection.

In summary, the method for warning of a traffic light based on machine vision technology and the detecting device thereof provided by the present application may determine the current traffic light status while following a vehicle and waiting for the traffic light.

If an obstacle is not detected by the second distance sensor, then there is no large vehicle ahead and view is not obstructed, thus the retractable assembly does not extend;

If an obstacle is detected by the first distance sensor, then the vehicle is in an underground garage or there is an obstacle above, thus the retractable assembly does not extend;

If the acceleration sensor detects that the vehicle is in motion, then the vehicle is not waiting for a traffic light, thus the retractable assembly does not extend or is retracted automatically.

If the acceleration sensor detects that the vehicle has stopped, and an obstacle is detected in front of the vehicle by the second distance sensor and no obstacle is detected by the first distance sensor, then the vehicle is currently waiting for the traffic light and there is a vehicle blocking the view ahead. At this time, the retractable assembly extends, and the camera at a terminal end thereof is protruded to detect the status of the traffic light ahead. The detected result may be directly displayed on a display screen in the vehicle, and may be notified to the driver by sound or light. Therefore, this improves traffic efficiency and provides the driver with traffic status information.

For those skilled in the art, various other corresponding changes and deformations can be made based on the technical proposals and ideas described above, and all these changes and deformations shall fall within the scope of protection of the claims of the present application.

What is claimed is:

1. A method for warning of a traffic light based on machine vision technology, wherein the method comprises following steps:
   mounting a detecting device for detecting a traffic light on a top part of a vehicle, and mounting a notification assembly of the detecting device inside the vehicle;
   increasing a height of a camera of the detecting device to obtain current image information of the traffic light when a detection request of traffic light status is received; and
   determining the traffic light status in the current image information of the traffic light using the machine vision technology, sending a determined result to the notification assembly, and providing a driver with current traffic light information using the notification assembly.

2. The method for warning of a traffic light based on machine vision technology according to claim 1, wherein the step of receiving the detection request of the traffic light status comprises:
   determining information detected by an acceleration sensor, and performing following step if the vehicle is determined to have stopped, the detection request of the traffic light status is deemed to be raised if an obstacle is detected in front of the vehicle and not above the vehicle.

3. A detecting device used by the method for warning of a traffic light based on machine vision technology according to claim 1, wherein the detecting device comprises:
   a device main body;
   a retractable assembly mounted on the device main body;
   distance sensors and an acceleration sensor mounted on the device main body;
   a camera for observing the traffic light; and
   a notification assembly for displaying the traffic light status,
   the device main body comprises a first connecting part for fix connection with the vehicle, a second connecting part for connection with the retractable assembly, and a driving assembly for driving the retractable assembly, the device main body is equipped with a first distance sensor at an upper end thereof for detecting whether an obstacle exists above the vehicle, and a second distance sensor at a front end thereof for detecting whether a vehicle exists ahead.

4. The detecting device according to claim 3, wherein the second connecting part comprises two supporting bases arranged in parallel, each supporting base is provided with a hinge hole, a bottom part of the retractable assembly is provided with a connecting shaft, and the connecting shaft is mounted in the hinge holes, so that the connecting shaft is in transmission connection with the driving assembly.

5. The detecting device according to claim 4, wherein the retractable assembly comprises a plurality of sets of transmission mechanisms, each of the transmission mechanisms includes two connecting rods hinged together at a midpoint of the connecting rods; the hinge hole are provided at two ends and the midpoint of the connecting rods, and adjacent transmission mechanisms of the retractable assembly are connected by hinge shafts.

6. The detecting device according to claim 4, wherein the retractable assembly comprises a plurality of connecting rods, both ends of the connecting rods are provided with a hinge hole, the connecting rods are sequentially connected by hinge shafts, and the camera is mounted on an uppermost connecting rod.

7. The detecting device according to claim 3, wherein the first connecting part is a mounting hole or an adhesive structure.

8. The detecting device according to claim 3, wherein the device main body is equipped with a control circuit board.

9. The detecting device according to claim 8, wherein the control circuit board is provided with a Bluetooth chip or a Wi-Fi chip for communication with the vehicle.

10. The detecting device according to claim 9, wherein the device main body is equipped with a battery.

11. The detecting device according to claim 3, wherein the step of receiving the detection request of the traffic light status comprises:
    determining information detected by an acceleration sensor, and performing following step if the vehicle is determined to have stopped, the detection request of the traffic light status is deemed to be raised if an obstacle is detected in front of the vehicle and not above the vehicle.

12. The detecting device according to claim 11, wherein the second connecting part comprises two supporting bases arranged in parallel, each supporting base is provided with a hinge hole, a bottom part of the retractable assembly is provided with a connecting shaft, and the connecting shaft is mounted in the hinge holes, so that the connecting shaft is in transmission connection with the driving assembly.

13. The detecting device according to claim 12, wherein the retractable assembly comprises a plurality of sets of transmission mechanisms, each of the transmission mechanisms includes two connecting rods hinged together at a midpoint of the connecting rods; the hinge hole are provided at two ends and the midpoint of the connecting rods, and adjacent transmission mechanisms of the retractable assembly are connected by hinge shafts.

14. The detecting device according to claim 12, wherein the retractable assembly comprises a plurality of connecting rods, both ends of the connecting rods are provided with a hinge hole, the connecting rods are sequentially connected by hinge shafts, and the camera is mounted on an uppermost connecting rod.

15. The detecting device according to claim 11, wherein the first connecting part is a mounting hole or an adhesive structure.

16. The detecting device according to claim 11, wherein the device main body is equipped with a control circuit board.

17. The detecting device according to claim 16, wherein the control circuit board is provided with a Bluetooth chip or a Wi-Fi chip for communication with the vehicle.

18. The detecting device according to claim 17, wherein the device main body is equipped with a battery.

\* \* \* \* \*